Dec. 19, 1961 M. SCHNEIDER 3,013,497
AUTOMATIC PROPORTIONAL METERING AND DISPENSING SYSTEM
Filed Oct. 22, 1958 2 Sheets-Sheet 1

INVENTOR.
MARVIN SCHNEIDER
BY
James and Franklin
ATTORNEYS

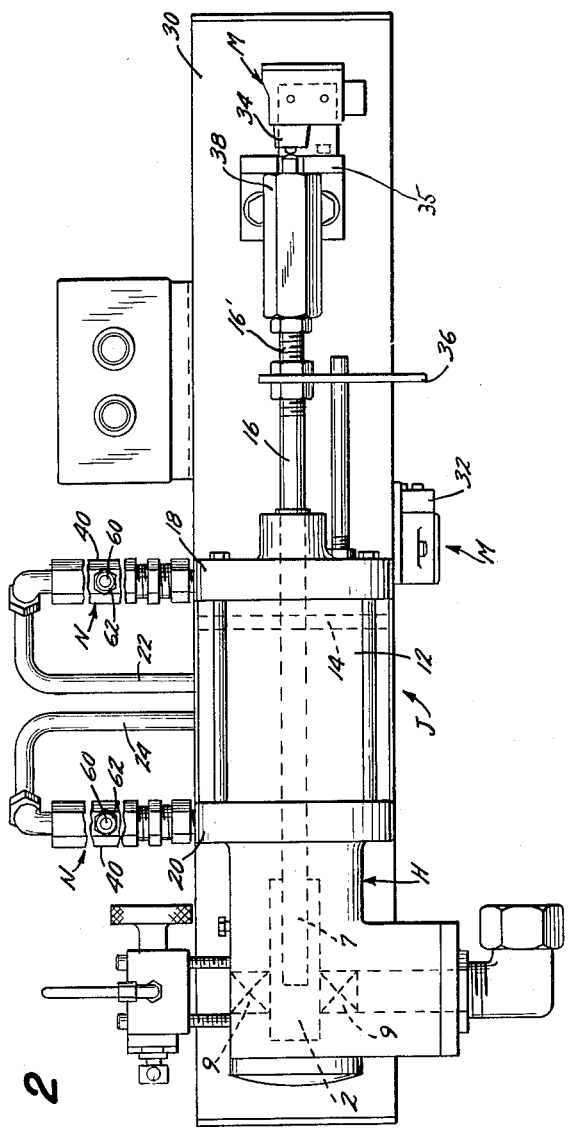
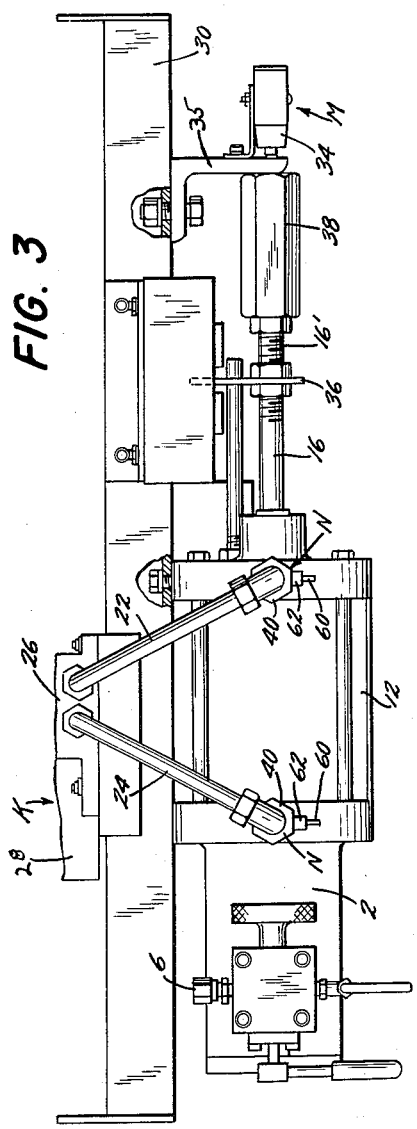

United States Patent Office 3,013,497
Patented Dec. 19, 1961

3,013,497
AUTOMATIC PROPORTIONAL METERING AND DISPENSING SYSTEM

Marvin Schneider, Wyncote, Pa., assignor to Novo Industrial Corporation, a corporation of New York
Filed Oct. 22, 1958, Ser. No. 768,982
14 Claims. (Cl. 103—6)

The present invention relates to an externally powered system for feeding a plurality of substances in relative controlled volumetric ratios, and in particular to the use in such systems of external fluid-pressure-operated sources of power.

There is an ever increasing demand for system capable of automatically feeding accurately predetermined amounts of different substances to a common receptacle, which usually takes the form of a mixing chamber. One of the main fields in which such systems are used is in the compounding of resin-hardener mixes capable of curing to a set condition at room temperature in a short period of time. Such mixes are widely used for the encapsulation or "potting" of electrical components in order to effectively insulate them from adverse atmospheric conditions. Combinations of epoxy resins and hardeners therefore are quite widely used for this purpose. The characteristics of such epoxy resin-hardener mixes are very sensitive to the relative amounts of the components, and consequently precise accuracy in proportioning these components is required. Systems of the type under discussion are also widely used for the formulation of adhesive layers and other surface coatings adapted to be applied to a wide variety of objects, and to the handling of polyurethane foams.

In my Patent 2,788,953 of April 16, 1957, entitled, "Automatic Proportional Metering, Mixing and Dispensing System," a system is disclosed which is exceptionally well adapted to satisfy the needs of the industry in this regard. In the specific embodiment of that system there disclosed the materials to be mixed are maintained under pressure in their reservoirs, and the reservoir pressure is relied upon to force the material completely through the system and to power the metering elements which measure and control the relative proportions of the two substances. Further development of the system there disclosed has revealed that for many applications, it is desirable to employ an external source of power to actuate the positive displacement pumps which constitute the metering elements of the system. Through the use of such auxiliary power the speed of operation of the system is increased and the system is rendered capable of handling substances of quite high viscosity.

However, with this improvement the maintenance of accurate proportionality at all times of the amounts of the two substances fed to the common receptacle or mixer, sometimes a problem even with the self-powered system, often becomes even more troublesome than before, especially when mixers of small volumetric capacity are employed.

In accordance with the basic concept of the system of my Patent 2,788,953, which basic concept underlies the operation of the system here specifically disclosed and claimed, the individual substances are each provided with a separate feed system including a cyclically operating positive displacement pump. A double-acting interlock is operatively connected between the pumps so that neither pump can commence a new cycle of operation or part thereof until both have completed their previous cycle of operation or corresponding part thereof. When, as here disclosed, an external source of power is provided to actuate the pumps, the double acting interlock is directly active upon that external source of power, thereby controlling the operation of the pumps.

It sometimes occurs that the external source of power is capable of actuating the pump associated therewith more rapidly than the substance metered and fed thereby can respond. For example, if the substance is highly viscous and if the pump is moved by the external source of power rapidly in an intake direction, it may reach the end of its cyclical movement in that direction before the pump has been completely filled by the viscous substance in that feed system. If the other pump completes its intake cycle before the first pump has completely filled, both pumps will be actuated by the interlock between them to deliver material and hence the pump associated with the viscous material will not deliver a full volumetric charge on that delivery stroke.

It is also desirable, particularly where mixers of small volumetric capacity are employed, that the feed or delivery strokes of the two metering pumps should both begin and end together. If the materials are to be fed in substantially the same volume per stroke, and if they are also of substantially the same viscosity, no particular problem arises. However, where the proportions of the two substances vary greatly, as, for example, by a ratio of five to one, or where one material is considerably more viscous than the other, or where both of these situations exist, the two externally powered metering pumps will tend to complete their delivery strokes at different times even though those strokes may commence at the same time. Hence from moment to moment proportions of the two substances in the mixer may vary widely.

While it is theoretically possible to design equipment for a given specific purpose, that is to say, for use with a particular plurality of substances to be mixed in a predetermined proportional relationship, from a practical point of view this cannot be done. In the first place, even in a given plant a machine may be called upon to utilize different materials or to deliver the same materials at different rates, depending upon the particular operation to be performed at a given time. In addition, from the point of view of the manufacturer of this equipment for this purpose, it is essential, if the equipment is not to be exhorbitantly expensive, that it be of general applicability, and that control means be provided to adapt it to the specific use to which it may be put at any time and in any given installation.

The system of the present invention resolves all of these problems in an exceptionally efficient and effective manner. In accordance therewith the cyclical positive displacement metering pumps are powered by fluid pressure motors, one for each pump, those motors being here disclosed as of the conventional piston and cylinder type, with appropriate valve means operatively connected thereto so as to control the movement of the piston first in one direction and then in the other, the piston of the motor being connected to the associated pump so that for one direction of movement of the motor piston the pump is actuated in an intake sense and in the other direction of motion of the motor piston the pump is actuated in a delivery sense. The valve means for the motor in each feed system is connected to the motor valve means in the other feed system by means of a double acting interlock, so that, after each movement of a given motor piston in one cyclical sense, movement thereof in the other cyclical sense cannot commence until the motor piston in the other system has completed its first cyclical movement, until, in other words, it has caught up with the motor piston in the first system.

In order to control the speed of operation of each motor, and hence the speed of operation of the metering pump powered thereby, adjustable fluid throttling means are connected in at least one of the feed systems between the source of fluid under pressure and the motor. Hence that motor may have its speed of operation increased or decreased, for pump intake or delivery or both, so as to give rise to the desired operating characteristics of the pumps such as, for example, to cause a pump operating on a viscous fluid to move more slowly on its intake stroke in order to prevent the occurrence of voids in the pump, or to cause the pump metering and feeding a small volume of material to operate more slowly than a pump metering and feeding a large volume of material, or to slow down a pump acting on material of low viscosity, so that the relative volumes of material expelled from the two pumps are substantially constant at all times during their feeding strokes.

In the form here specifically disclosed the motors are powered pneumatically and throttling valves, preferably of the one-way type, are interposed between one or both ends of the motor and controlling the valve therefor. Where one-way throttling valves are employed a selection of throttling of flow of pressure fluid either toward or away from the motor cylinder gives further control of the desired mode of operation of the pumps.

To the accomplishment of the above, and to such other objects as may hereinafter appear, the present invention relates to a system for the automatic proportional metering and dispensing of a plurality of substances, as defined in the appended claims and as described in this specification, taken together with the accompanying drawings, in which:

FIG. 2 is a side elevational view of a combined metering pump and motor utilized therein;

FIG. 3 is a top plan view thereof; and

The system of the present invention will be here described as specifically employed for feeding and mixing closely proportioned quantities of resin and hardener. It is extremely important, if uniformity of the physical and chemical characteristics of the mixed material is to be attained, that the proportions of resin and hardener be accurately controlled and held constant throughout the operation of the system. Accordingly the present system produces a uniform composition of the mixed material by utilizing constant volume measuring devices which are individually powered and which are actuated through the use of valves and appropriate interlocking controls, so that when one of those units has permitted a predetermined quantity of its substance to reach the mixer it will not permit any more of its substance to feed until the other measuring device has correspondingly acted. Moreover, the feeding and intake strokes of the measuring devices may be individually controlled so that the desired degree of accuracy may be maintained from feeding stroke to feeding stroke and, if desired, even during the time that the feeding strokes occur.

Figure 1:
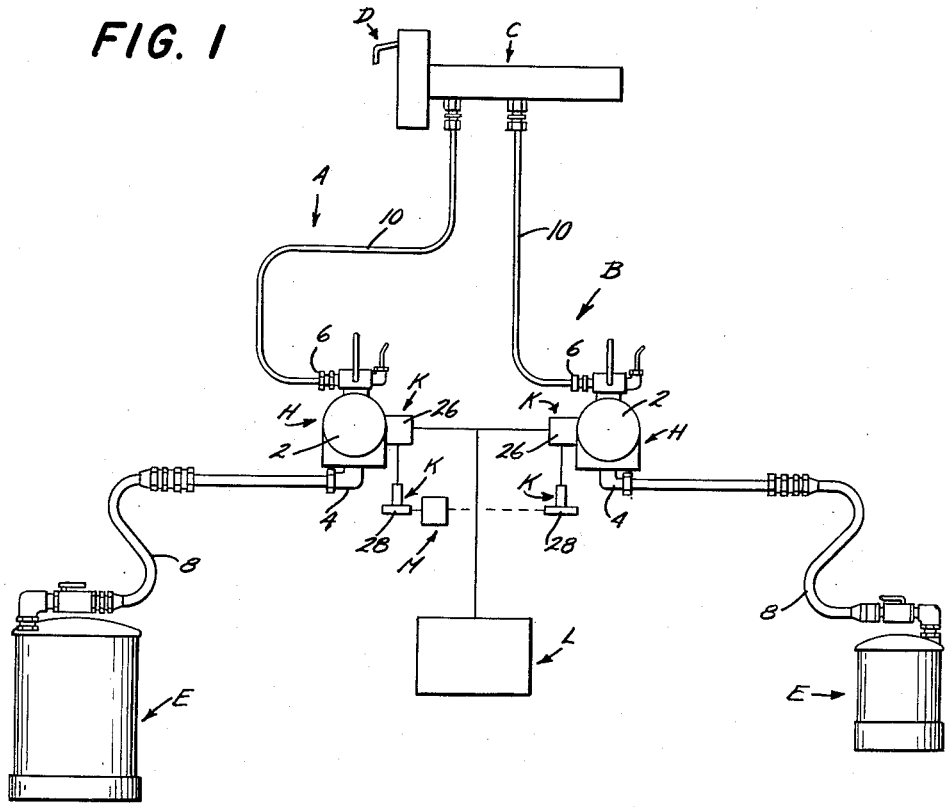
FIG. 1 is a schematic view of one embodiment of the system of the present invention.

In order to accomplish these results, the overall system of the present invention comprises two separate feed systems generally designated A and B (see FIG. 1), one for resin and the other for hardener, these systems leading to a common receptacle C where the individual substances are thoroughly mixed. From there the mixed materials are dispensed through a nozzle D. In order to ensure accuracy of proportionality of the two substances, the systems A and B are always filled and are of fixed volume. The substances come from any suitable sources at controlled pressures, such as reservoirs E the interiors of which are preferably pressurized so as to provide a force for feeding those substances to the metering devices H, one in each feed system A and B, the metering devices H being here disclosed as piston type pumps powered by fluid pressure motors J controlled by valve means K, a fluid pressure source L being operatively connected to the motors J via the valves K. A double acting interlock M, which may be of the type disclosed in my Patent 2,788,953, is active between the valves K in each feed system A and B. Those valves K are here disclosed as of the two-position type, and used in conjunction with a fluid pressure motor J of the piston and cylinder type. The valve K in one position connects one end of the motor J to the pressure source L and connects the other end of the motor to exhaust, these positions being reversed when the valve K is moved to its other position. The interlock M is effective to prevent the shifting of a given valve K from one position to the other until the piston of the motor J controlled thereby and the piston of the other motor J have both reached the end of their travel in the direction in which they have been urged by the valves K in said one position. Consequently, each of the individual metering devices H is permitted but a single cycle of operation for a corresponding cycle of operation of the other. In addition, adjustable fluid throttling means N are provided in at least one of the feed systems A or B between the pressure fluid source L and the motor J in order to permit control of the speed of operation thereof to correspond to the particular operating conditions encountered.

The positive displacement cyclical operative metering pumps H may comprise a cylinder 2 having an inlet 4 and an outlet 6 within which cylinder 2 a rod or piston 7 is reciprocable. The inlet 4 may be connected to the reservoir E by means of conduit 8 and the outlet 6 may be connected to the mixer C by means of conduit 10. Check valves, schematically shown and designated 9, may be provided in the metering pump inlet and outlets 4 and 6, all as is conventional. Movement of the piston 7 in such a way as to increase the effective volume of the interior of the cylinder causes substance from the reservoir E to enter the cylinder, the pressure in the reservoir facilitating the flow of that substance through the conduit 8, and movement of the piston or rod in the other direction expels a predetermined volume of substance from the cylinder 2 through the outlet 6 and the conduit 10 to the mixer C. By adjusting the distance which the piston or rod 7 moves the volume of substance dispensed on each cycle of operation of the metering pump H can be controlled, assuming always that the cylinder 2 fills completely during the intake stroke of the pump H.

The motor J which powers the pump H comprises a cylinder 12 within which piston 14 is slidable. The pump rod 7 is connected to the piston 14 for movement therewith, and a rod 16 is also connected to the piston 14 and extends out beyond an end of the cylinder 12. Ports 18 and 20 are provided at each end of the cylinder 12 and are connected by conduits 22 and 24 respectively to a three-way two-position valve 26 controlled by solenoid 28. The entire assembly is mounted on a bracket 30 on which a pair of switches 32 and 34 are mounted. The switch 32 is engaged by arm 36 carried by rod 16 when the piston 14 has moved all the way to the left. The switch 34 is engaged by the end of nut 38 when the piston H has moved all the way to the right. Both the arm 36 and the nut 38 are adjustably mounted on the threaded end 16' of the rod 16, and by adjustment of their position the travel of the piston 14 may be controlled. Positive stops for movement of the piston 14 are provided by brackets 35 for right hand movement of the piston 14 and internal cylinder structure for left hand movement of the piston 14. The switches 32 and 34, in conjunction with a source of electric power and the solenoids 28, constitute the double acting interlock M, all as disclosed in my Patent 2,788,953. Each of the switches 32 for the feed systems A and B may be connected in series to the solenoids 28, as are each of the switches 34. Hence the solenoids 28 will be actuated to simultaneously change the positions of the valves K only after both switches 32 or 34 have been appropriately actuated by the arms 36 or nuts 38, depending upon the direction in which the pump pistons 14 have been moved. Since each pump piston or rod 7 is directly connected to its motor piston 14, its travel, and hence the volume of material dispensed by the pump H on each cycle of operation thereof, will be controlled by the setting of the arm 36 and the nut 38.

The adjustable throttling means N which permit control of the speed of operation of the motors J (as distinguished from the magnitude of their travel) may take a wide variety of forms. As here specifically disclosed they comprise one-way flow control valves shown in cross section in FIG. 4. These valves comprise a casing 40 having upper and lower chambers 42 and 44 separated by partition 46 provided with openings 48 and 50. A ball 52 is located in chamber 42 and is urged by spring 54 to seat against the partition opening 50. Needle valve 56 is threadedly mounted on the casing 40 at 58, its tip extending into the partition opening 48 and its rear end 60 extending out through the exterior of the casing 40, rotation of the part 60 causing the needle valve tip 56 to move relative to the partition opening 48 in order to vary the size of the opening therebetween. A lock nut 62 may be provided to fix the needle valve 56 in position. Flow of fluid through the casing 40 in the direction of the arrow 64 will be relatively free, the fluid forcing the ball 52 to the right against the spring 54 so as to open the aperture 50. Flow of fluid through the casing 40 in the direction of the arrow 66 will, however, serve to urge the ball 52 into seated position closing the partition aperture 50, the fluid thus being forced to flow between the needle valve tip 56 and the partition aperture 48 in a throttled manner, the degree of throttling being controlled by the position of the needle valve tip 56.

Figure 4:
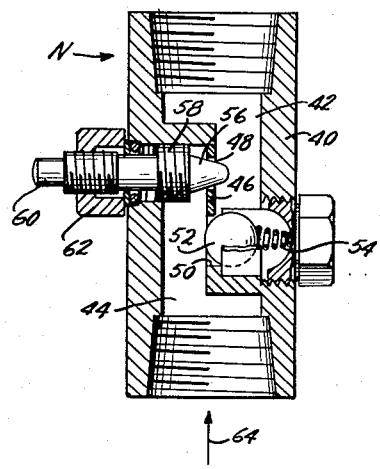
FIG. 4 is a cross sectional view of one type of adjustable fluid throttling means which may be employed.

As here disclosed, to provide for greatest flexibility in control, a pair of throttling valves N are employed for a given motor J, one in each of the lines 22 and 24. If a given valve N is oriented in its line as shown in FIG. 4 it will permit free flow of fluid out from the motor cylinder 12 but will throttle the flow of fluid thereinto. If the valve N is reversed the direction of free flow and throttling will be reversed.

A few typical examples will illustrate various ways in which the adjustable throttling means N may be employed. If the substance in one of the feed systems A is particularly viscous and if the piston or rod 7 in the metering pump H associated therewith moves to the right as viewed in FIG. 2 so rapidly that the viscous material flowing from the reservoir E through the conduit 8 cannot keep up with it, then a void will be formed inside the metering pump cylinder 2. If the other pump H completes its intake stroke before this void has been filled by the viscous fluid, both pumps H will commence their feed stroke. The first mentioned pump H, however, will still have a void therein, and consequently even though the rod 7 of that pump may move a distance corresponding to a given volume of material, the actual volume of material fed thereby will be less than that predetermined volume in accordance with the size of the void. In such a situation the adjustable throttling device N associated with the motor J which powers that pump H will be adjusted to reduce the speed of the motor piston 14 as it moves to the right as viewed in FIG. 2 (intake stroke), the adjustment preferably being such as to cause the metering pump rod 7 to move only as fast as the viscous material associated therewith can flow into the cylinder 2. Since the material is viscous it is desirable that the feed or delivery stroke of the metering pump associated therewith be powered to as a great a degree as possible and that it move just as fast as the viscous material will let it move. Accordingly, no throttling would be desired when the motor piston 14 moves to the left. To satisfy this situation a single adjustable throttling means N could be employed either in the line 22 or 24. If it is in the line 22 it will be oriented to throttle fluid flow out from the cylinder 12 as viewed in FIG. 2 and to permit free flow of fluid into the cylinder 12. If it is located in the line 24 it will have an opposite orientation. By placing the valve in line 24, where fluid flow into the cylinder is throttled, a more uniform rate of movement of the motor piston 14 during its intake stroke will result, particularly if the stroke is of appreciable length.

Apart from the question of viscosity, if the substances in the feed systems A and B are to be mixed in disparate proportions, such as five or ten to one, the pump H feeding the smaller proportion of liquid should operate a slower rate than the pump H feeding the larger amount of liquid, all other things being equal, if the feed strokes of the two pumps H are to finish at the same time, it being remembered that because of the double acting interlock M those feed strokes will always start at the same time. The relative viscosity of the two substances further complicate the situation. If the substance to be fed in the small amount is of lower viscosity than the substance to be fed in higher amount, the speed of operation of the metering pumps H in the feed systems A and B will, unless appropriately controlled, be even more disparate than if the viscosities were the same. Even when the same amounts of each substance are to be fed on a given cycle of operation on the metering pumps H, differences in their viscosity will give rise to different speeds of operation of their respective metering pumps H unless those pumps are otherwise controlled. Hence, through the use of the adjustable throttling means N, the feed stroke of the motor-pump combination associated with the less viscous material, or the material to be fed in smaller quantities, may be throttled down so that the duration of its feed stroke will correspond to that of the feed stroke of the other feed system. To throttle the feed stroke of the motor J in FIG. 2 the valve N in the line 22 would be oriented to throttle fluid entering the cylinder 12, or the means N in the line 24 would be oriented to throttle fluid leaving the cylinder 12.

In a standard installation, and as is here specifically disclosed, it is preferred to provide one-way throttling means N in each of the lines 22 and 24. If no throttling is desired the needle valves 56 in each of the means N will be backed off completely, thus providing for free flow through the valve N in both directions. If throttling is desired the magnitude thereof can be determined by the adjustable positioning of the needle valve 56 in one or both of the means N, and the direction of that throttling can be controlled by the orientation of the means N. In this way a standard unit can be used to provide throttling either on the intake or delivery stroke and, through a choice as to whether the throttling effect is operative on flow into or out from the cylinder, fine control of the movement of the motor piston 14, and hence of the pump rod 7, can be accomplished.

While but a single embodiment of the present invention has been here disclosed, it will be apparent that many variations may be made therein, all within the scope of the instant invention as defined in the following claims.

I claim:

1. A system for feeding a plurality of substances in predetermined relative amounts comprising a pair of separate feed systems each comprising a substance source, a cyclical positive displacement pump operatively connected to said source and to an outlet line for feeding said source to said outlet line, a fluid pressure motor operatively connected to said pump to actuate the latter, a source of fluid under pressure operatively connected to said motor, said last mentioned operative connection for each of said separate feed systems comprising separate valve means controlling the operation of the motor associated with that system, and adjustable fluid throttling means between said fluid source and said motor in at least one of said systems, thereby to control the speed of operation of said motor and hence of the pump actuated thereby.

2. The system of clam 1, in which said adjustable throttling means is located between said valve means and said motor.

3. The system of claim 2, in which said motor comprises a piston movable in a cylinder, said valve means being operatively connected to both ends of said cylinder, said adjustable throttling means comprising two adjustable throttling elements, each between said valve and a different end of said cylinder.

4. A system for feeding a plurality of substances in predetermined relative amounts comprising a pair of separate feed systems each comprising a substance source, a cyclical positive displacement pump operatively connected to said source and to an outlet line for feeding said source to said outlet line, a fluid pressure motor operatively connected to said pump to actuate the latter, a source of fluid under pressure operatively connected to said motor said last mentioned operative connection comprising valve means controlling the operation of said motor, double-acting interlock means between the valve means of each system, whereby said valves are actuated to cause the pumps associated therewith to resume their cycle of operation only after both pumps have completed their previous cyclical movement, and adjustable fluid throttling means between said fluid source and said motor in at least one of said systems, thereby to control the speed of operation of said motor and hence of the pump actuated thereby.

5. The system of claim 4, in which said adjustable throttling means is located between said valve means and said motor.

6. The system of claim 5, in which said motor comprises a piston movable in a cylinder, said valve means being operatively connected to both ends of said cylinder, said adjustable throttling means comprising two adjustable throttling elements, each between said valve and a different end of said cylinder.

7. A system for feeding a plurality of substances in predetermined relative amounts comprising a pair of separate feed systems of fixed volume adapted to be completely filled by their respective substances and leading to a common receptacle, each of said feed systems comprising a substance source, a cyclical positive displacement pump having inlet and outlet, a conduit of fixed volume between said source and said pump inlet, a conduit of fixed volume between said pump outlet and said receptacle, an hydraulic motor operatively connected to said pump to actuate the latter, a source of hydraulic fluid under pressure operatively connected to said motor, said last mentioned operative connection for each of said separate feed systems comprising separate valve means movable between operative positions effective to cause the motor associated with that system to move in a predetermined manner and cause the pump associated therewith to perform a predetermined cyclical movement, and one-way adjustable fluid throttling means between said fluid source and said motor in at least one of said systems, thereby to control the speed of operation of the motor and hence of the pump actuated thereby.

8. The system of claim 7, in which said adjustable throttling means is located between said valve means and said motor.

9. The system of claim 8, in which said motor comprises a piston movable in a cylinder, said valve means being operatively connected to both ends of said cylinder, said adjustable throttling means comprising two adjustable throttling elements, each between said valve and a different end of said cylinder.

10. A system for feeding a plurality of substances in predetermined relative amounts comprising a pair of separate feed systems of fixed volume adapted to be completely filled by their respective substances and leading to a common receptacle, each of said feed systems comprising a substance source, a cyclical positive displacement pump having inlet and outlet, a conduit of fixed volume between said source and said pump inlet, a conduit of fixed volume between said pump outlet and said receptacle, a hydraulic motor operatively connected to said pump to actuate the latter, a source of hydraulic fluid under pressure operatively connected to said motor said last mentioned operative connection comprising valve means movable between operative positions effective to cause the motor associated therewith to move in a predetermined manner and cause the pump associated therewith to perform a predetermined cyclic movement, double-acting interlock means between the valve means of each system, whereby said valves are actuated to cause the pumps associated therewith to preform their next succeeding cyclical movement only after both pumps have completed their previous cyclical movement, and one-way adjustable fluid throttling means between said fluid source and said motor in at least one of said systems, thereby to control the speed of operation of the motor and hence of the pump actuated thereby.

11. The system of claim 10, in which said adjustable throttling means is located between said valve means and said motor.

12. The system of claim 11, in which said motor comprises a piston movable in a cylinder, said valve means being operatively connected to both ends of said cylinder, said adjustable throttling means comprising two adjustable throttling elements, each between said valve and a different end of said cylinder.

13. A system for feeding a plurality of substances in predetermined relative amounts comprising a pair of separate feed systems each comprising a substance source, a cyclical positive displacement pump operatively connected to said source and to an outlet line for feeding said source to said outlet line, a fluid pressure motor operatively connected to said pump to actuate the latter, a source of fluid under pressure operatively connected to said motor, said last mentioned operative connection comprising valve means controlling the operation of said motor, and adjustable fluid throttling means located between said valve means and said motor in at least one of said systems, thereby to control the speed of operation of said motor and hence of the pump actuated thereby, said motor comprising a piston movable in a cylinder, said valve means being operatively connected to both ends of said cylinder, said adjustable throttling means comprising two adjustable throttling elements, each between said valve and a different end of said cylinder.

14. A system for feeding a plurality of substances in predetermined relative amounts comprising a pair of separate feed systems of fixed volume adapted to be completely filled by their respective substances and leading to a common receptacle, each of said feed systems comprising a substance source, a cyclical positive displacement pump having inlet and outlet, a conduit of fixed volume between said source and said pump inlet, a conduit of fixed volume between said pump outlet and said receptacle, an hydraulic motor operatively connected to said pump to actuate the latter, a source of hydraulic fluid under pressure operatively connected to said motor, said last mentioned operative connection comprising valve means movable between operative positions effective to cause the motor associated therewith to move in a predetermined manner and cause the pump associated therewith to perform a predetermined cyclical movement, and one-way adjustable fluid throttling means located between said valve means and said motor in at least one of said systems, thereby to control the speed of operation of the motor and hence of the pump actuated thereby, said motor comprising a piston movable in a cylinder, said valve means being operatively connected to both ends of said cylinder, said adjustable throttling means comprising two adjustable throttling elements, each between said valve and a different end of said cylinder.

References Cited in the file of this patent

UNITED STATES PATENTS

| | | |
|---|---|---|
| 731,241 | Steiner | June 16, 1903 |
| 1,995,815 | Purdum | Mar. 26, 1935 |
| 2,167,623 | Britter | Aug. 1, 1939 |
| 2,172,016 | Scheider et al. | Sept. 5, 1939 |
| 2,178,396 | Landenberger | Oct. 31, 1939 |
| 2,788,953 | Schneider | Apr. 16, 1957 |
| 2,858,767 | Smith | Nov. 4, 1958 |